United States Patent Office 3,362,244
Patented Jan. 9, 1968

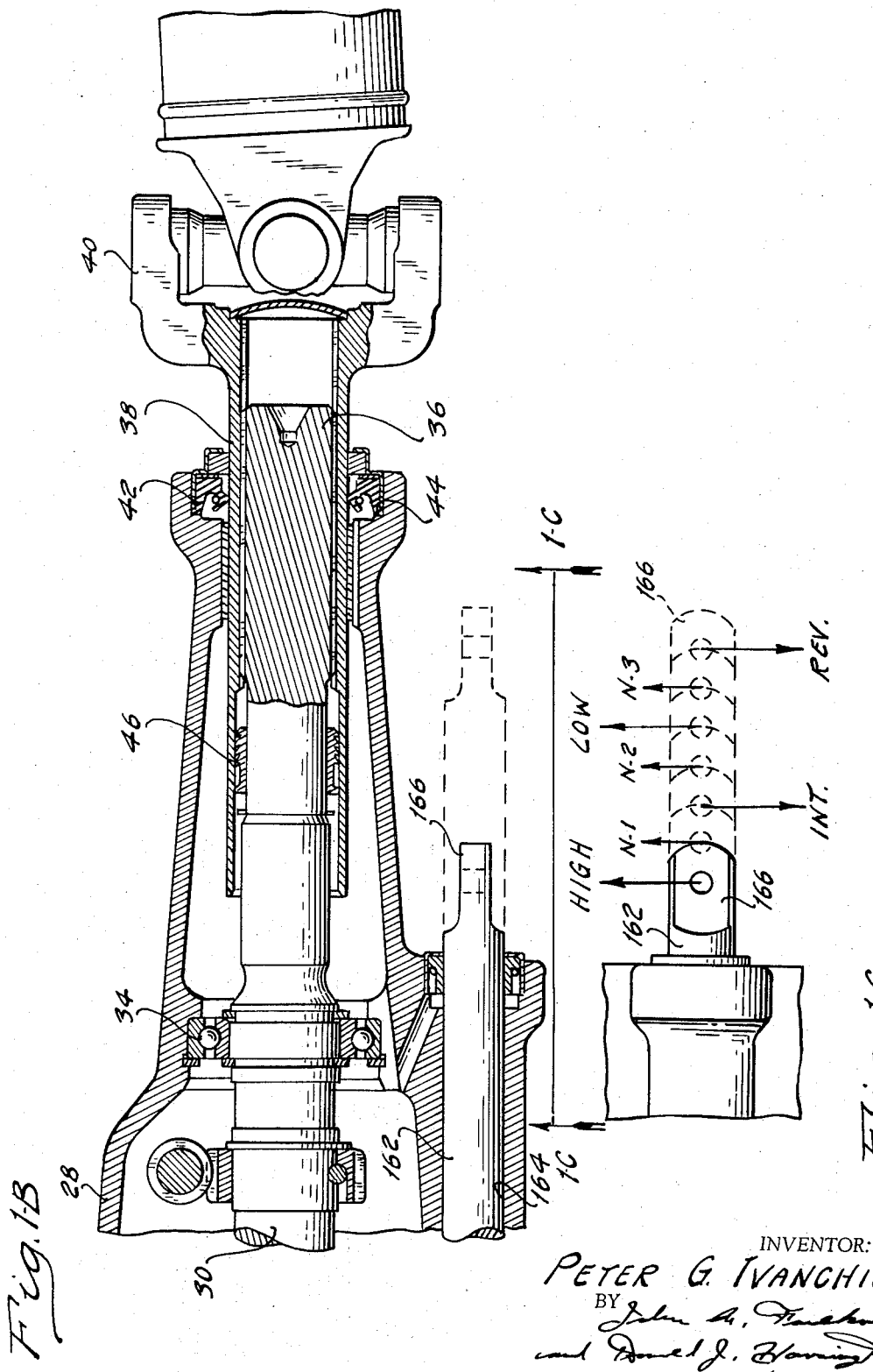

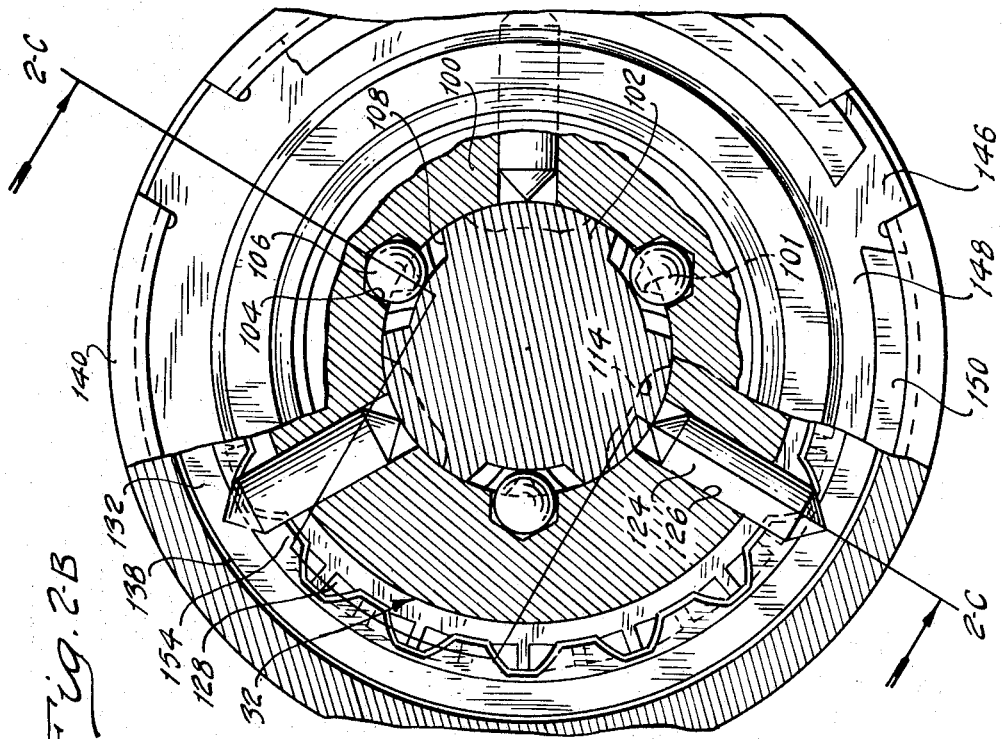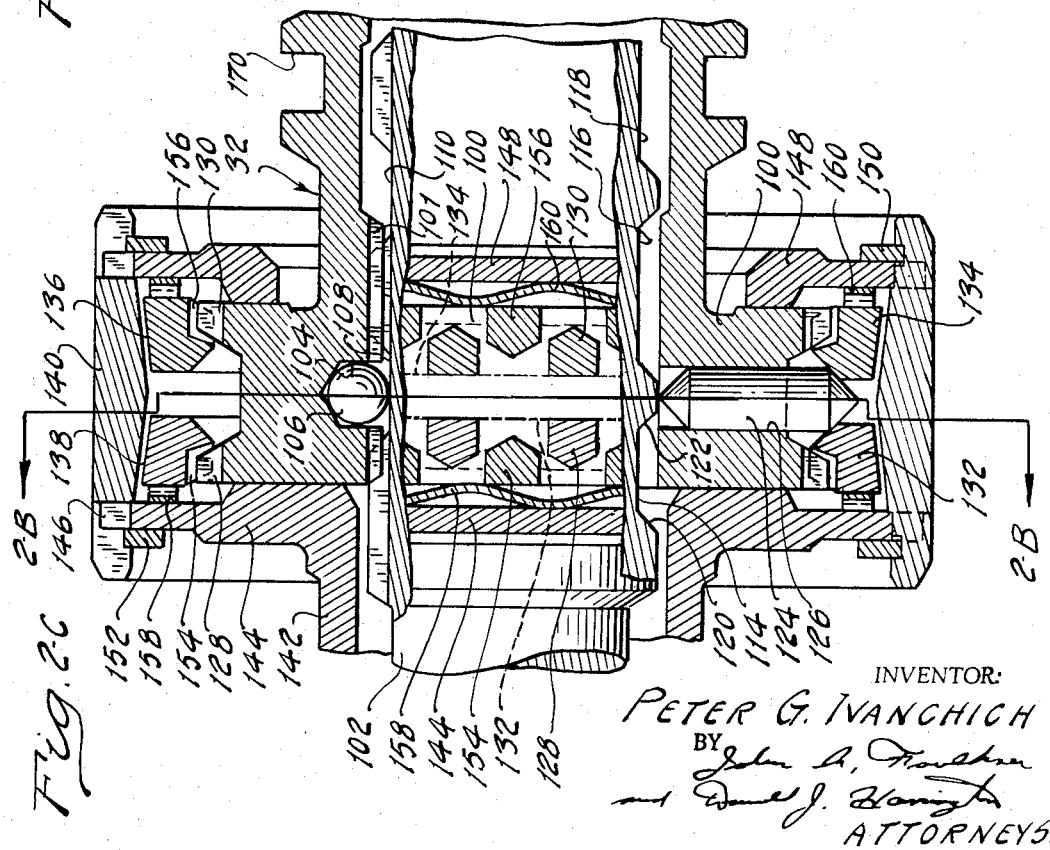

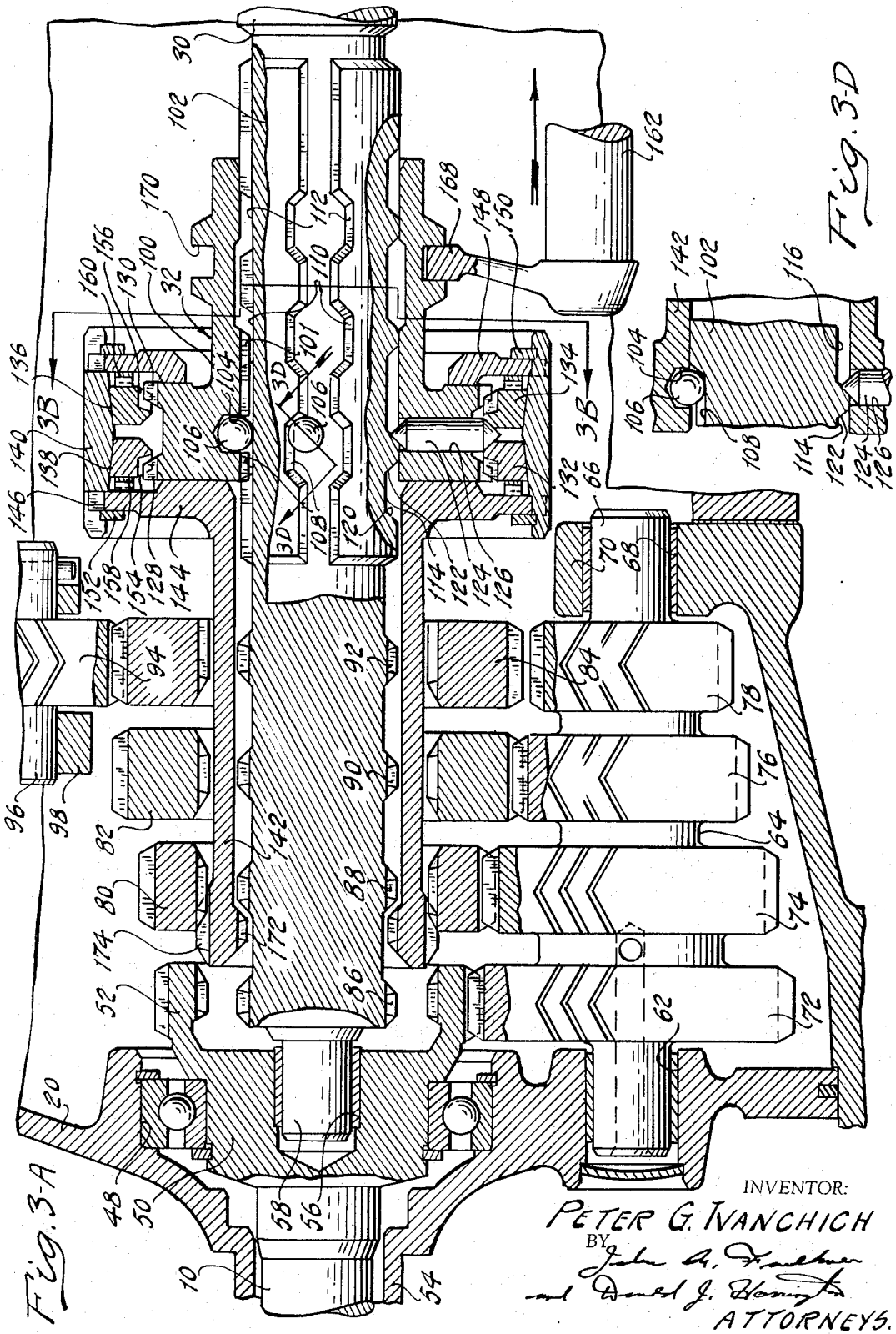

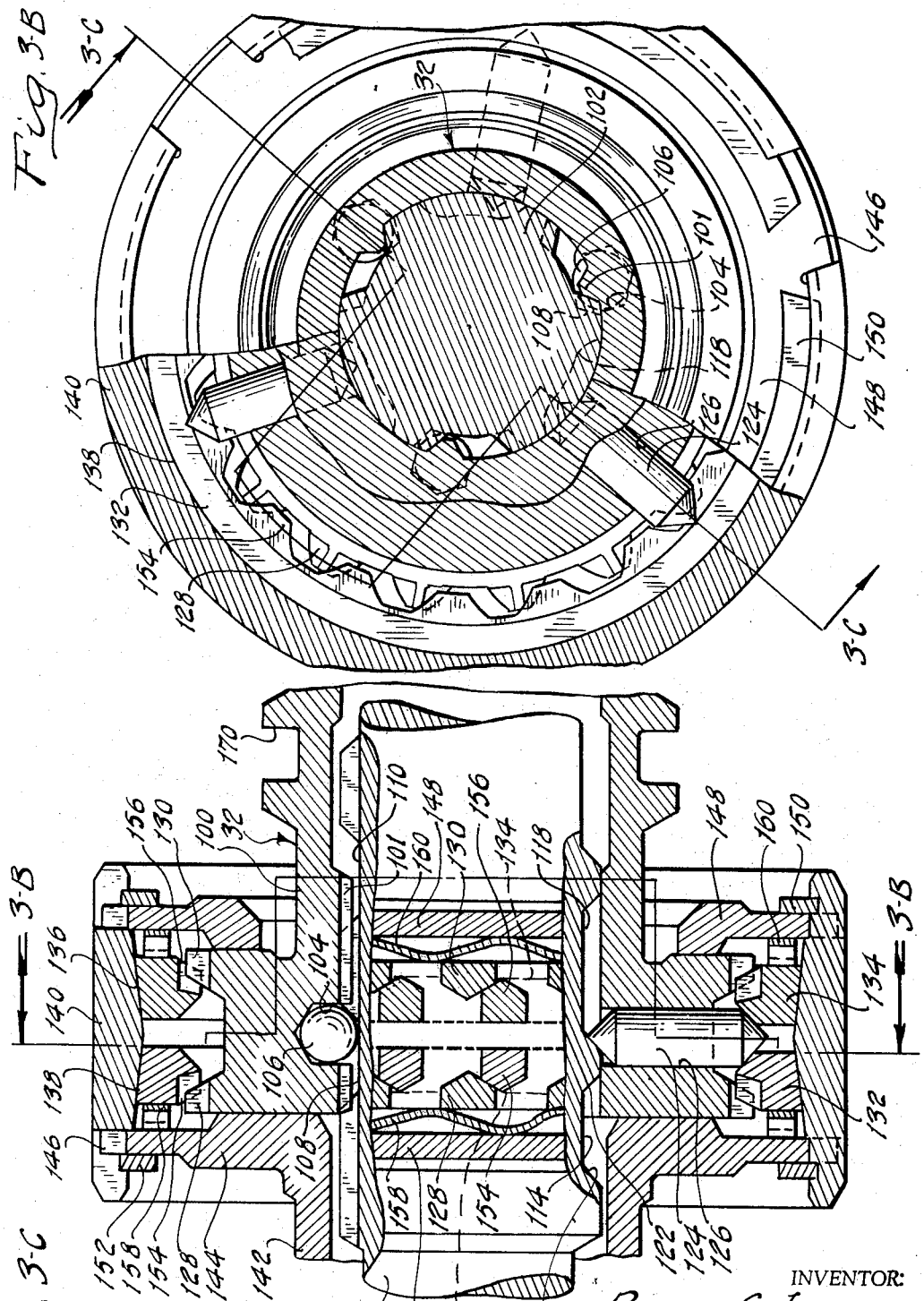

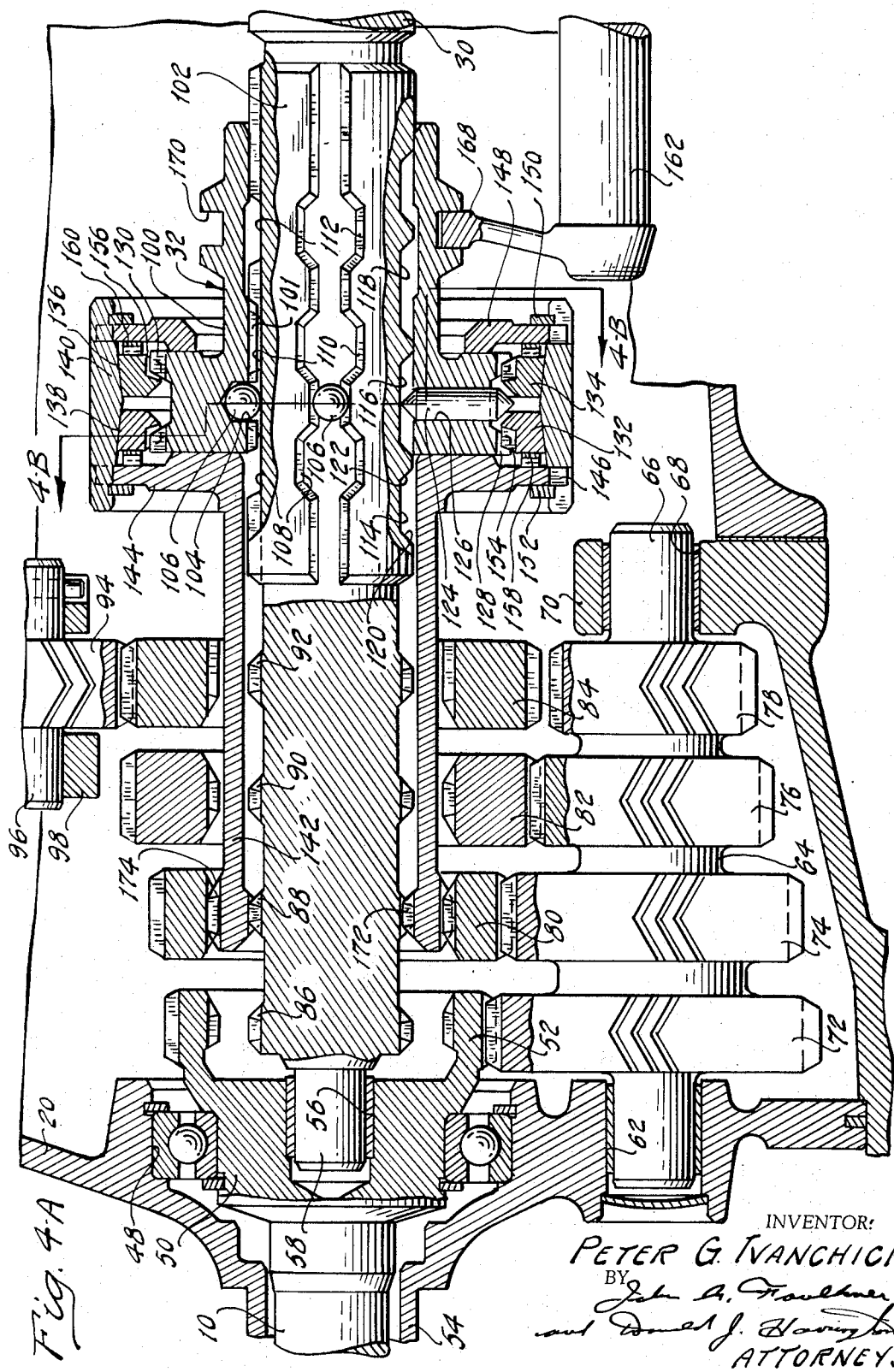

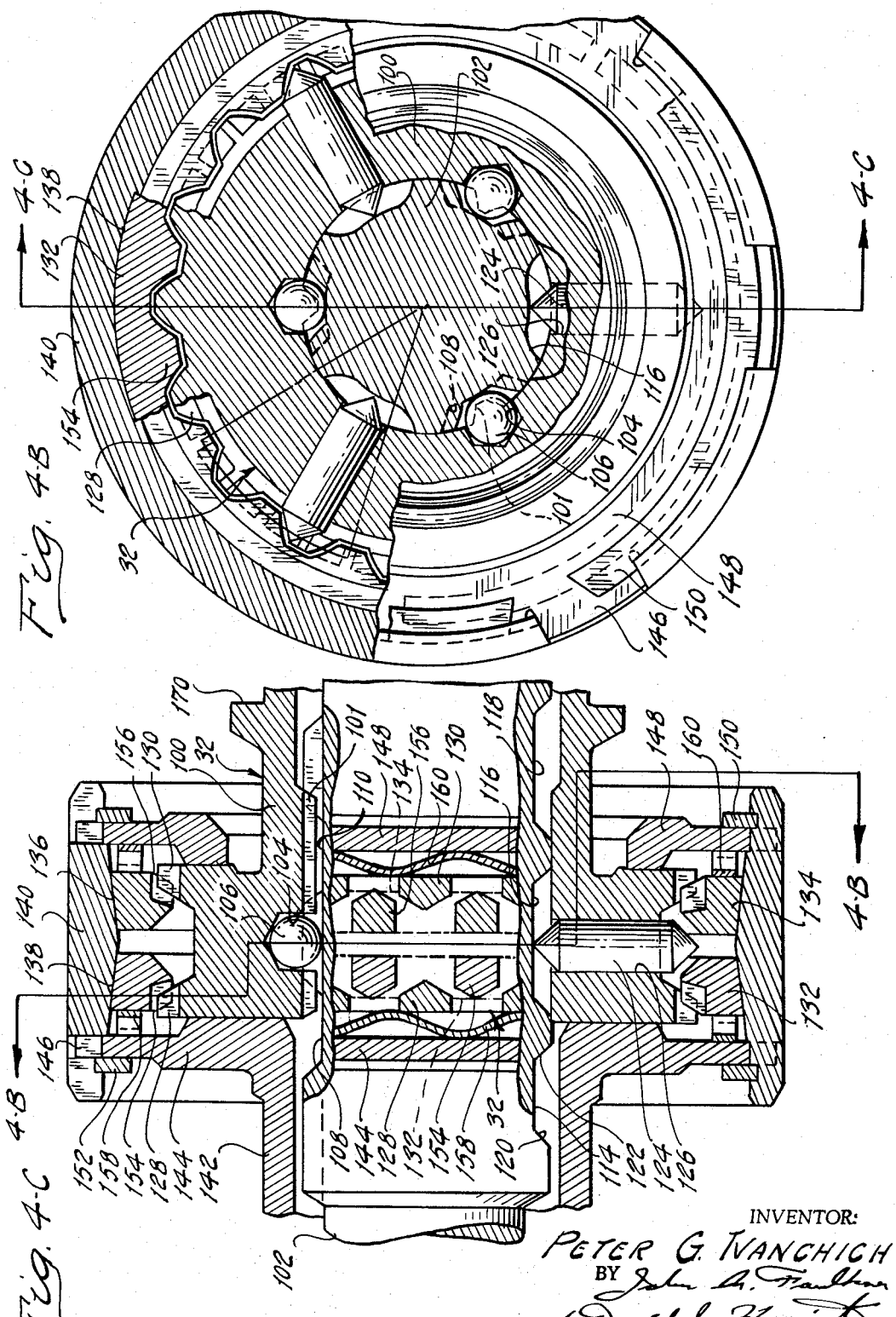

3,362,244
MULTIPLE RATIO POWER TRANSMISSION SYSTEM WITH A MANUALLY OPERATED SYNCHRONIZER
Peter G. Ivanchich, Dearborn, Mich., assignor to Ford Motor Company, Dearborn, Mich., a corporation of Delaware
Filed May 2, 1966, Ser. No. 546,744
15 Claims. (Cl. 74—339)

My invention relates generally to improvements in torque transmitting gearing having multiple speed ratios. It relates more particularly to an improved synchronizer clutch construction for synchronizing the motion of torque delivery elements of the gearing during speed ratio changes.

The improvement of my invention can be applied readily to the gearing arrangement shown in my copending application, Ser. No. 462,567, filed June 9, 1965. That application discloses a multiple ratio power transmission mechanism having power output gearing situated for rotation about the axis of a power output shaft in meshing engagement with angularly spaced cluster gear assemblies. The power output gears are supported solely by the elements of the cluster gear assemblies. A power input gear, which engages drivably in a continuous fashion one element of each of the cluster gear assemblies, is arranged coaxially with respect to the power output gears.

The improved synchronizer clutch assembly of my invention is capable of establishing in sequential fashion a driving connection between the power output shaft and each of the separate power output gears. For this purpose I use a clutch sleeve having internal and external teeth that separately engage cooperating clutch teeth formed on the output shaft and on each of the output gears. A common synchronizer assembly and clutch sleeve is provided for each of the output gears. As the synchronizer sleeve is shifted axially, the power output gears are engaged selectively. The angular velocity of the clutch sleeve assumes the angular velocity of the gear with which it is engaged prior to completion of the torque delivery path through the gearing. The momentum change that accompanies this change in velocity of the sleeve shaft is a minimum since the mass of the shaft and of the rotary portions of the synchronizer assembly to which it is connected is small.

Having assumed a speed of rotation that is in synchronism with the speed of rotation of the gear with which the sleeve shaft becomes engaged, the synchronizer assembly thereafter is self-energizing to produce a change in the speed of the driven shaft, the latter thus being brought into synchronism with the speed of the power output gear with which the synchronizer sleeve is in engagement.

Provision is made for blocking the completion of the torque delivery path during speed ratio changes until the power shaft is in true synchronism with the synchronizer sleeve shaft. The synchronizing action thus occurs in two stages. During the initial stage of a speed ratio shift interval, the synchronizer assembly is capable of accelerating the mass of the synchronizer sleeve and the associated rotary portions of the synchronizer clutch mechanism so that it is brought into synchronism with the rotating power output gear. This action occurs by reason of this self-energizing action of the synchronizer mechanism itself. This action triggers the subsequent synchronizing action that causes the power output shaft to be brought into synchronism with the rotating power output gear with which it is associated for any particular speed ratio change.

The provision of a synchronizer assembly for use in a transmission of this type is a principle object of my invention.

It is a further object of my invention to provide a power transmission mechanism having multiple ratio gearing wherein a single, self-energizing, synchronizer clutch assembly is used for establishing synchronism between the gears of each torque delivery path during speed ratio changes and wherein the driver controlled portions of the synchronizer clutch assembly include a single control member.

It is a further object of my invention to provide a synchronizer clutch assembly for use in an environment of the type above set forth wherein the driver controlled portions of the synchronizer clutch assembly are adapted for movement in a longitudinal direction during operation.

It is a further object of my invention to provide a synchronizer clutch assembly of the type above set forth wherein means are provided for blocking shifting movement of a driver controlled member when the gear elements of the torque delivery path selected by the operator are rotating at different angular velocities and which permits completion of the torque delivery path only when the gear elements are in synchronism.

It is a further object of my invention to provide a power transmission driveline of the type above set forth wherein the gear elements of the mechanism are brought into synchronism by means of a synchronizing clutch assembly requiring a minimum amount of space within the housing for the gear elements.

It is a further object of my invention to provide a power transmission mechanism of the type above set forth, which is characterized by a minimum number of parts and which is capable of being machined and assembled with a minimum amount of cost.

Further objects and features of my invention will become apparent from the following descriptions and from the accompanying drawings wherein:

FIGURE 2B is a subassembly view, taken along section line 2b—2b of FIGURE 2C, showing a portion of the gearing and a portion of the synchronizer clutch assembly used with the mechanism of FIGURE 1A;

FIGURE 2C is a cross-sectional view taken along the plane of section line 2c—2c of FIGURE 2B;

Figure 2A:
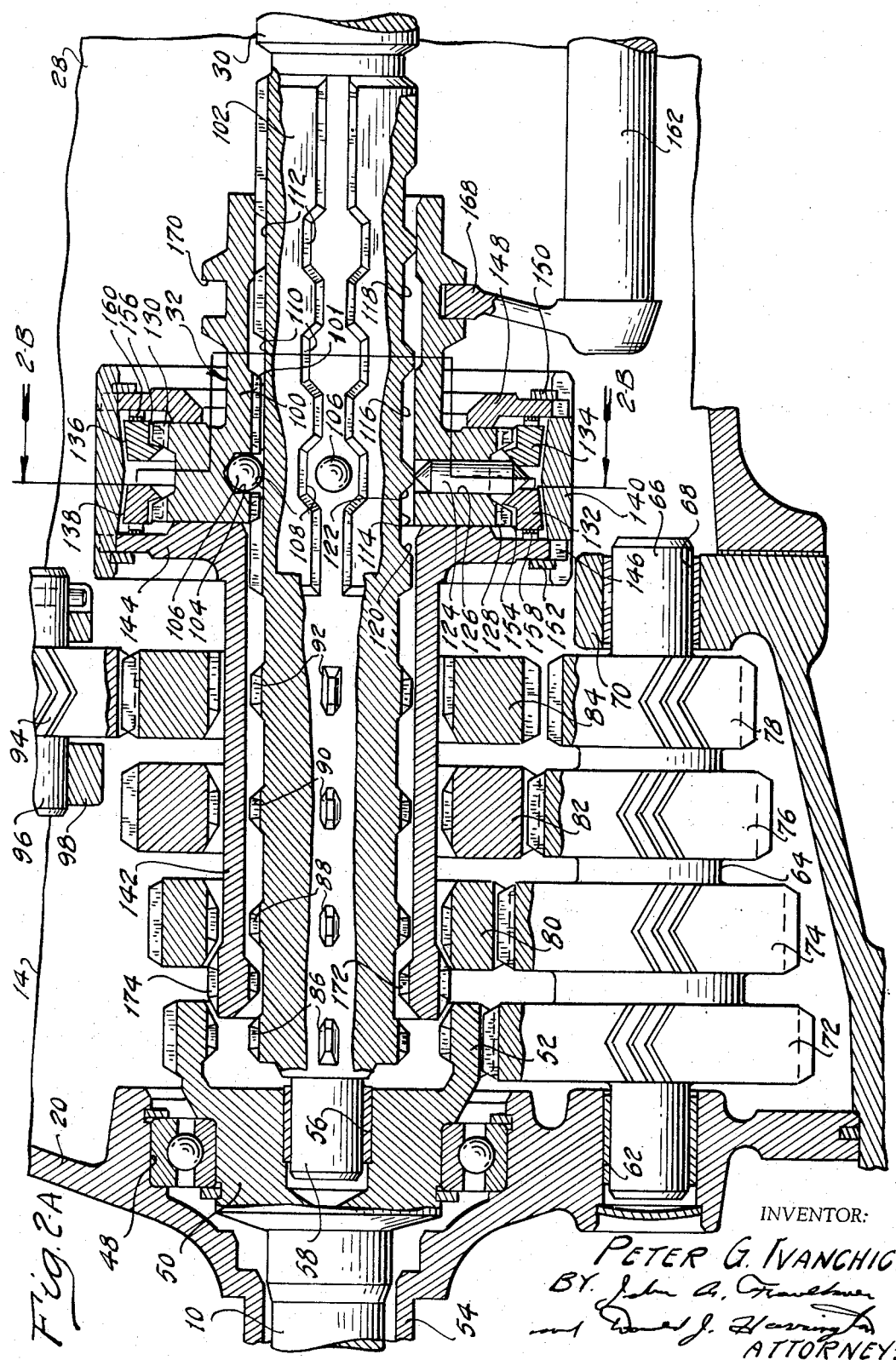
FIGURE 2A is an enlargement of parts of FIGURE 1A with the elements conditioned for neutral. The elements of FIGURE 1A are arranged for high speed ratio operation.

FIGURES 3A, 3B, 3C and 3D are views similar to FIGURES 2A, 2B and 2C although they show the synchronizer clutch mechanism in a different operating position. FIGURE 3B is a cross-sectional view taken along the plane of section line 3b—3b of FIGURE 3C. FIGURE 3C is a sectional view taken along section line 3c—3c of FIGURE 3B and FIGURE 3D is a sectional view taken along section line 3d—3d of FIGURE 3A;

FIGURES 4A, 4B and 4C are views similar to the views of FIGURES 2A, 2B and 2C, although they show a synchronizer clutch assembly in a fully engaged driving position. FIGURE 4B is a view taken along the plane of section 4b—4b of FIGURE 4C and FIGURE 4C is a sectional view taken along section line 4c—4c of FIGURE 4B.

Numeral 10 in FIGURE 1 designates a power input shaft which can be splined at 12 to the driven disc of a selectively engageable friction clutch not shown. The clutch is used to establish a releasable driving connection with the crankshaft of an internal combustion engine not shown. The engine and the clutch form a portion of an automotive vehicle driveline which is the environment in which my invention is used.

Numeral 14 designates the transmission housing. It includes a bell-shaped portion 16 that encloses the transmission clutch. The periphery of the housing portion 16 can be bolted to the engine block of the internal combustion vehicle engine. A forward wall 20 is secured at its periphery 22 by means of bolts 24 to a boss 26 formed in the housing portion 16. Secured to the right-hand end of the housing 14 is a tailshaft extension housing 28 which encloses power output shaft 30. My improved synchronizer clutch assembly is identified generally by reference character 32. The shaft 30 is journalled by means of bearings 34 within the right-hand end of the extension housing 28.

The right-hand end 36 of shaft 30 is splined to internally splined sleeve 38 of a universal joint yoke 40. A fluid seal 42 located within a seal opening 44 seals the interior of the extension housing 28. A rubber seal 46 surrounds shaft 30 and establishes sealing engagement with the inner surface of the sleeve 38.

The universal joint of which yoke 40 forms a part establishes a driving connection between shaft 30 and the drive shaft, which in turn is connected to the power input element of a differential gear mechanism which establishes a driving connection with transversely disposed axle shafts in the vehicle driveline.

The wall 20 is formed with a bearing opening 48 which journals the hub 50 of a power input gear 52. Hub 50 is connected directly to the power input shaft 10.

Wall 20 is formed with a stationary sleeve shaft 54 which surrounds shaft 10. It supports in the usual fashion a clutch throw-out bearing, not shown, which controls engagement and disengagement of the friction clutch. Hub 50 is formed with a pilot bearing opening for accommodating a pilot bearing 56 which journals a portion of 58 at the left-hand end of the power output shaft 30. The wall 20 is formed with bearing openings 62, each of which supports one end of a cluster gear assembly 64. The other end 66 of cluster gear assembly 64 is journalled within a bearing opening 68 formed in a boss 70 located at the right-hand end of the housing 14.

Cluster gear assembly 64 includes gear elements 72, 74, 76 and 78. These engage, respectively, power input gear 52, intermediate speed ratio gear 80, low speed ratio gear 82 and reverse drive gear 84. These gears are identified also in this description as the power output gears.

Power output shaft 30 is formed with external clutch teeth at axially spaced locations. These are identified by reference characters 86, 88, 90 and 92.

The cluster gear assemblies 64 are situated in angularly spaced relationship with respect to the axis of shaft 30. There are three such assemblies, and they rotatably support the power output gears 80 and 82. Gear element 78 engages drivably reverse drive pinions 94 which are mounted rotatably upon pinion shafts 96, each of the latter being received within a shaft opening formed in boss 98 and in boss 70. There are three such pinions, each of which is in engagement with power output gear 84.

Figure 1A:
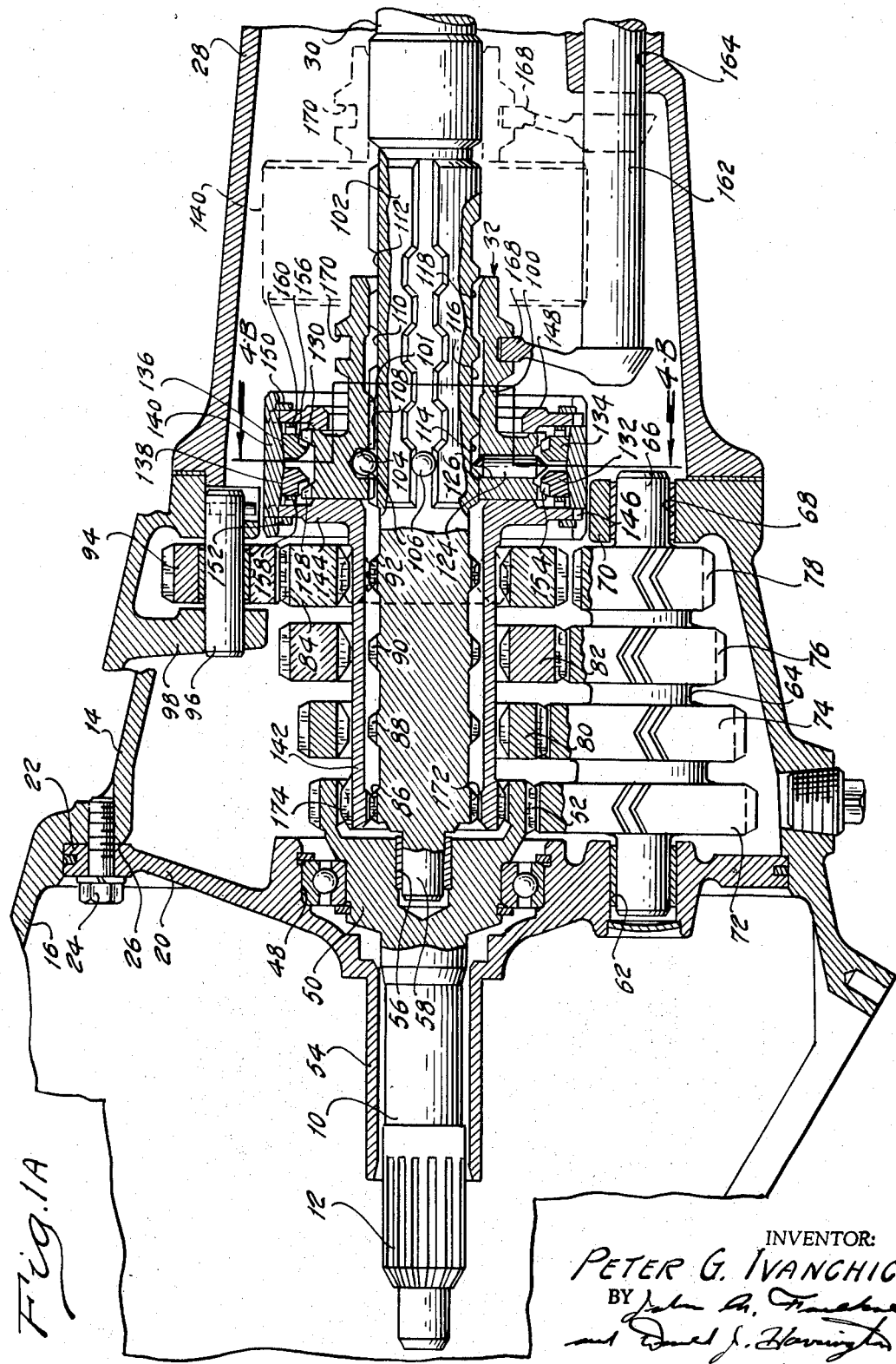
FIGURES 1 and 1B show in longitudinal cross-sectional form a power transmission mechanism embodying the improvements of my invention.
FIGURE 1C is a view as seen from the plane of section line 1c—1c of FIGURE 1B.

The pinion shown in FIGURE 1A and in FIGURE 2A at 94 is illustrated out of position. It engages the gear elements 78 on the cluster gear assemblies 64. Pinions 94 rotatably support power output gear 84.

The gear teeth on the gear elements of the cluster gear assemblies 64 and the meeting teeth of each of the power output gears are herringbone gear teeth. Thus thrust loads on the individual gear tooth engagements are eliminated.

The synchronizer assembly 32 includes a synchronizer sleeve 100, which is internally splined at 101 to the shaft 30. Shaft 30 is formed with wide tooth, external splines 102. The width of the space between the teeth 102 is substantially greater than the width of the teeth of the internal splines of sleeve 100 thereby permitting a limited degree of rotary motion of the sleeve 100 with respect to the shaft 30.

Located within the sleeve 100 is a recess 104 which receives a blocker ball element 106. The depth of the opening 104 is such that the ball 106 extends within the space between two adjacent external teeth of the external spline teeth 102.

At longitudinally spaced locations there is formed an enlargement in the spacing between two adjacent teeth 102 of the splines on the shaft 30. These enlargements are identified by reference characters 108, 110 and 112. The left-hand end and the right-hand end of each enlargement 108, 110 and 112 are formed with a 45° chamfer as indicated.

Formed also in the splined portion of shaft 30 are three sets of recesses 114, 116 and 118. There are three such sets situated at equally spaced locations along the axis of shaft 30. At each longitudinal end of the recesses 114, 116 and 118 there is formed a cam surface as shown at 120 and 122. A pin 124, which is slidably positioned within radial opening 126 in the hub 100, is adapted to be received within one or the other of the recesses 114, 116 or 118 depending upon the axial position of the sleeve 100 with respect to the shaft 30. The radially inward end of pin 124 is coned to provide a cammed surface that is complementary to the cammed surfaces 120 and 122. The radially outward end of pin 124 also is coned. There are three such pins situated at angularly spaced locations with respect to the axis of shaft 30.

The hub 100 is formed with two longitudinally spaced sets of synchronizer clutch teeth 128 and 130.

As best indicated in FIGURE 4, the synchronizer teeth 128 and 130 are formed with cammed surfaces. These cammed teeth are adapted to engage cammed teeth on synchronizer rings 132 and 134. One of the internal cammed teeth of each of the synchronizer rings is situated between two adjacent cammed teeth on the hub 100. Thus when one of the rings rotates with respect to the shaft 32, the cooperating cammed teeth on the ring and on the sleeve cause a camming action that will produce a longitudinal thrust force on the ring.

The radially outward periphery of ring 134 forms a coned clutch surface 136. A corresponding coned clutch surface 138 is formed on the ring 132. These clutch surfaces are adapted to engage internal coned clutch surfaces formed on a cone clutch element 140.

A synchronizer sleeve shaft 142 surrounds the left-hand end of the shaft 30. It carries a radially extending flange 144, the outer periphery of which is keyed at 146 to the cone clutch element 140.

A reaction ring 148 also is carried by the cone clutch element 140 and is held axially fast by a snap ring 150. A corresponding snap ring 152 prevents shifting movement of the element 140 with respect to the flange 144. The ring 132 is formed with cammed teeth 154 which mesh with the cammed teeth 128 on the hub 100. In similar fashion internal cammed teeth 156 register and mesh with cammed teeth 130 formed on the hub 100. Teeth 156 are in continuous engagement with teeth 130 and teeth 154 are in continuous engagement with teeth 128. Ring 132 is urged normally into frictional engagement with the coned surface formed on the element 140 by a circular, waved, spring washer 158. A similar spring washer 160 normally urges synchronizer ring 134 into frictional clutching engagement with the element 140.

The radially outward end of the pin 124 is coned so that when it moves radially outwardly, it engages chamfered surfaces on each of the rings 132 and 134, thereby urging these rings apart. At the same time the frictional connection between the rings and the synchronizer clutch element 140 is disconnected.

There are three balls 106 located at angularly spaced positions about the axis of the shaft 30. Each ball is received by the separate splined groove for the splines 102.

A shaft rod 162 is slidably positioned within an opening 164 formed in the tailshaft extension housing 28. Rod 162 extends outwardly to permit a connection with a suitably manually controlled shift ratio controlling lever. At 166 the inner end of the rod 162 is formed with a shift fork 168, which is received within a clutch sleeve groove 170.

The synchronizer clutch sleeve 142 is formed with internal clutch teeth 172 and with external clutch teeth 174. The teeth 172 are adapted to engage selectively the external clutch teeth 86, 88, 90 and 92 formed on the shaft 30. The external clutch teeth 174 are adapted to engage selectively the gears 52, 80, 82 and 84. The direct drive, high speed ratio condition is shown in FIGURE 1A where gear 52 is connected directly to sleeve 142, which in turn is connected to shift 30 through assembly 32.

When the synchronizer clutch assembly assumes the condition shown in FIGURE 2A, the teeth 174 are intermediate the teeth of gears 52 and 80. Likewise clutch teeth 172 are located intermediate external clutch teeth 86 and 88. This position corresponds to the neutral condition where all the torque delivery paths are inactive.

If we assume that the transmission is shifted for operation in high speed ratio, the synchronizer clutch assembly will assume the position shown in FIGURE 1A. In moving from the FIGURE 2A position to the FIGURE 1A position, the driver shifts the rod 162 in a left-hand direction. Initially the clutch teeth 174 will engage drivably the internal clutch teeth on the gear 52. The rotating clutch sleeve 142 then is brought into synchronism with the motion of gear 52. No appreciable momentum change occurs at this time because of the decreased mass of the sleeve 142 and the parts of the synchronizer clutch assembly that rotate with it. Thus the engagement of the teeth 174 with the internal teeth of gear 52 is not accompanied by undesirable inertia forces.

The pins 124 then begin to move into recess 114. This occurs under the influence of springs 158 and 160. As the pins 124 ride radially inwardly down the ramps 122 of the recesses 114, the springs 158 and 160 cause the synchronizer clutch rings 132 and 134 to become frictionally engaged with the element 140. The resulting cone friction clutch forces thus are established due to the relative rotation of the element 140. This causes rings 132 and 134 to engage the cammed teeth 128 and 130 of the hub 100. At that time the full synchronizing action occurs as synchronism is established between the rotating shaft 30 and the sleeve 142 which, of course, is rotating at the same speed as the gear 52. The camming action of the teeth 128 and 130 relative to the teeth 154 and 156, respectively, causes synchronizing action to occur. The degree of engagement of the cone clutch surfaces of the synchronizer mechanism then is the function of the synchronizing torque produced by the relatively rotating masses.

During the time that the synchronizing action occurs, the hub 100 becomes displaced rotatably with respect to the shaft 30. This then causes balls 106 to shift to one side of the enlargement 108. When the balls are thus excentrically positioned within the associated spline openings, it is impossible to shift the sleeve 142 so that the teeth 172 engage teeth 86. The balls and the engaging portions of the enlargements 108 prevent such axial movement. When synchronism occurs between shaft 30 and the hub 100, the balls 106 become centrally aligned thereby permitting the hub 100 to be shifted so that teeth 172 engage teeth 86. Thus a driving connection is established between shaft 10 and shaft 30.

The transmission mechanism can be shifted from the direct drive high speed ratio condition to an intermediate speed ratio condition by shifting the sleeve 142 in a right-hand direction. The sleeve will pass through the neutral position shown in FIGURE 2A until it assumes the position shown in FIGURE 3A. At that time the teeth 174 engage the internal teeth formed in gear 80. The sleeve then is decelerated so that its speed matches the speed of the intermediate gear 80. This change in speed does not cause an unduly harsh change in the moment of momentum since the mass of the sleeve 142 and the associated rotary portions of the synchronizer clutch structure is of reduced magnitude as explained earlier. Continued movement of the sleeve 142 in a right-hand direction will cause the pins 124 to move radially inwardly under the influence of the synchronizer springs 158 and 160. This condition is illustrated in FIGURE 4A. As the radially inward ends of the pins 124 engage recesses 116, the synchronizer rings 132 and 134 become frictionally engaged with the cone clutch element 140. This causes them to shift rotatably until the synchronizer teeth 154 engage teeth 128. As soon as the occurs, a camming action is established that tends to increase the clutching action of the synchronizer ring 132 with respect to the element 140 until its speed is synchronized. This causes the cluster gear assembly and the power output shaft 30 to establish synchronism. While this synchronizing action takes place, the balls 106 enter the enlargement 108 and become concentrically positioned with respect to the opening between the splined teeth 102. The balls 106 thus act as a blocker that prevents shifting movement of the sleeve 142 to a position that will cause teeth 172 to engage teeth 88. When synchronism is established, however, the balls 106 become centrally positioned thereby permitting the sleeve 142 to be shifted until teeth 172 become fully engaged with teeth 88. This establishes a geared connection between the cluster gear element 74 and the power output shaft 30 as shown in FIGURE 4A.

A downshift to the low speed ratio is accomplished by shifting the sleeve 142 further in a right-hand direction until teeth 174 engage the internal teeth of gear 82. When synchronism is established by the synchronizing clutch assembly, the sleeve can be shifted until teeth 172 engage teeth 90. The downshift from the intermediate speed ratio to the low speed ratio is similar to the downshift from the high speed ratio to the intermediate speed ratio.

Reverse drive is accomplished by shifting the sleeve 142 until the teeth 174 engage the internal teeth of gear 84 and the teeth 172 drivably engage teeth 92 on the power output shaft 30.

Having thus described a preferred form of my invention, what I claim and desire to secure by U.S. Letters Patent is:

1. A power transmission system comprising a power output shaft, a power input shaft, geared torque delivery paths adapted to connect drivably said power output shaft and said power input shaft, said torque delivery paths comprising power output gears journalled for rotation about the axis of said power output shaft, internal clutch teeth formed in said gears, external clutch teeth carried by said power output shaft, a synchronizer clutch sleeve mounted in coaxial disposition with respect to said power output shaft for sliding movement in the direction of the axis of said power output shaft, first clutch teeth carried by said sleeve and adapted for engagement with the internal teeth of said gears, second clutch teeth carried by said sleeve and adapted for driving engagement with the teeth on said power output shaft, means for shifting said sleeve in an axial direction with respect to the axis of said power output shaft, and synchronizer clutch means having relatively movable portions carried by said sleeve and by said power output shaft for synchronizing the motion of said power output shaft and said sleeve prior to completion of a torque delivery path through said clutch teeth.

2. The combination as set forth in claim 1 wherein said synchronizer clutch means comprises a clutch hub splined to said power output shaft, friction clutch means for connecting selectively said hub to said sleeve, the connection between said hub and said power output shaft being adapted to accommodate axial shifting movement of said hub and limited relative rotary movement of said hub with respect to said power output shaft, and blocker means for inhibiting axial shifting movement of said hub with respect to said power output shaft when said hub assumes an angular position relative to said driven member that is displaced from a central relative neutral position.

3. The combination as set forth in claim 1 wherein said synchronizer clutch means comprises a hub splined to said power output shaft and a cone clutch element connected to said sleeve, the latter adapted for relative rotation with respect to said hub, a synchronizer ring carried by said hub, said ring and said hub having registering teeth, a radially movable element carried by said hub with a radially outward end thereof engageable with a portion of said ring, a cam formed on said driven shaft, the radially inward end of said element engaging said cam, cooperating friction clutch surfaces formed on said ring and on said synchronizer clutch element, said radially movable element being adapted to urge said synchronizer ring out of clutching engagement with said clutch element upon shifting movement of said hub with respect to said power output shaft to a position corresponding to a position of said sleeve where said second clutch teeth are disengaged from the registering teeth of said power output shaft.

4. The combination as set forth in claim 3 wherein the registering teeth on said hub and on said synchronizer ring are formed with cammed surfaces whereby a friction clutch engaging force is applied to said synchronizer ring when said sleeve and said hub are rotating at different speeds and said radially movable element is in a radially inward postion with respect to the axis of said driven shaft.

5. The combination as set forth in claim 3 wherein the registering teeth on said hub and on said synchronizer ring are formed with cam surfaces whereby a friction clutch engaging force is applied to said synchronizer ring when said sleeve and said hub are rotating at different speeds and said radially movable element is in a radially inward position with respect to the axis of said driven member, and spring means for normally urging said synchronizer ring into clutching engagement with said synchronizer clutch element.

6. The combination as set forth in claim 3 wherein the registering teeth on said hub and on said synchronizer ring being formed with cam surfaces whereby a friction clutch engaging force is applied to said synchronizer ring when said sleeve and said hub are rotating at different speeds and said radially movable element is in a radially inward position with respect to the axis of said driven shaft, said synchronizer clutch means including also a second synchronizer ring, said second synchronizer ring and said hub being formed also with cam teeth, said synchronizer ring having formed thereon a second clutch surface, the teeth of said second synchronizer ring and the cooperating teeth of said hub urging said second synchronizer ring into clutching engagement with said clutch element when said hub and said sleeve rotate at differential speeds, said radially movable element urging simultaneously each of said synchronizer rings out of clutching engagement with said clutch element as said sleeve is moved to a neutral position out of engagement with said driven shaft.

7. In a power transmission mechanism a driving shaft, a driven shaft, torque transmitting gearing adapted to establish torque delivery paths between said driving shaft and said driven shaft, said gearing comprising power output gears mounted for rotation about the axis of said driven shaft, plural sets of clutch teeth carried by said driven shaft, clutch teeth carried by each of said power output gears, a synchronizer clutch sleeve surrounding said driven shaft and carrying thereon two sets of clutch teeth, one set of clutch teeth of said sleeve being adapted to engage selectively the teeth of said driven shaft and the other set of teeth of said sleeve being adapted to engage selectively the teeth carried by said power output gears upon axial shifting movement of said sleeve from one axial position to the other, and synchronizer clutch means including relatively movable portions carried by said sleeve and by said driven shaft for synchronizing the motion of said driven shaft with respect to said sleeve upon engagement of the teeth of the driven shaft by the registering teeth of said sleeve.

8. The combination as set forth in claim 7 wherein said synchronizer clutch means comprises a hub splined to said driven shaft and a cone clutch element connected to said sleeve, the latter being adapted for relative rotation with respect to said hub, a synchronizer ring carried by said hub, said ring and said hub having registering teeth, a radially movable element carried by said hub with a radially outward end thereof engageable with a portion of said ring, a cam formed on said driven shaft, the radially inward end of said element engaging said cam, cooperating friction clutch surfaces formed on said ring and on said synchronizer clutch element, said radially movable element being adapted to urge said synchronizer ring out of clutching engagement with said clutch element upon shifting movement of said hub with respect to said driven shaft to a position corresponding to a position of said sleeve where said one set of clutch teeth are disengaged from the registering teeth of said driven shaft.

9. The combination as set forth in claim 8 wherein the registering teeth on said hub and on said synchronizer ring being formed with cammed surfaces whereby a friction clutch engaging force is applied to said synchronizer ring when said sleeve and said hub are rotating at different speeds and said radially movable element is in a radially inward position with respect to the axis of said driven member.

10. The combination as set forth in claim 8 wherein the registering teeth on said hub and on said synchronizer ring are formed with cam surfaces whereby a friction clutch engaging force is applied to said synchronizer ring when said sleeve and said hub are rotating at different speeds and said radially movable element is in a radially inward position with respect to the axis of said driven shaft, a spring means for normally urging said synchronizer ring into clutching engagement with said synchronizer clutch element.

11. The combination as set forth in claim 7 wherein said synchronizer clutch means compries a clutch hub splined to said driven shaft, friction clutch means for connecting selectively said hub to said sleeve, the connection between said hub and said driven shaft being adapted to accommodate axial shifting movement of said hub and limited relative rotary movement of said hub with respect to said driven shaft, and blocker means for inhibiting axial shifting movement of said hub with respect to said driven shaft when said hub assumes an angular position relative to said driven member that is displaced from a central relative neutral position.

12. The combination as set forth in claim 11 wherein the registering teeth on said hub and on said synchronizer ring are formed with cam surfaces whereby a friction clutch engaging force is applied to said synchronizer ring when said sleeve and said hub are rotating at different speed and aid radially movable element in in a radially inward position with respect to the axis of said driven member, and spring means for normally urging said synchronizer ring into clutching engagement with said synchronizer clutch sleeve.

13. The combination as set forth in claim 11 wherein the registering teeth on said hub and on said synchronizer ring are formed with cammed surfaces whereby a friction clutch engaging force is applied to said synchronizer ring when said sleeve and said hub are rotating at different speeds and said radially movable element is in a radially inward position with respect to the axis of said driven shaft, said synchronizer clutch means including also a second synchronizer ring, said second synchronizer ring and said hub being formed also with cammed teeth, said second synchronizer ring having formed thereon a second clutch surface, the teeth of said second synchronizer ring and cooperating teeth of said hub urging said second synchronizer ring into clutching engagement with said clutch sleeve when said hub and said sleeve rotate at differential speeds, said radially movable element urging simultaneously each of said synchronizer rings out of clutching engagement with said clutch sleeve as said sleeve is moved to a neutral position out of engagement with said driven shaft.

14. The combination as set forth in claim 11 wherein said synchronizer clutch means is adapted for relative rotation with respect to said hub, a synchronizer ring carried by said hub, said ring and said hub having registering teeth, a radially movable element carried by said hub with a radially outward end thereof engageable with a portion of said ring, a cam having recesses formed on said driven member, the radially inward end of said movable element engaging said cam recess, cooperating friction clutch surfaces formed on said ring and on said synchronizer clutch element, said movable element being adapted to urge said synchronizer ring out of clutching engagement with said clutch element upon shifting movement of said hub with respect to said driven member to a position corresponding to a position of said sleeve where said one set of clutch teeth are disengaged from the registering teeth of said driven shaft.

15. The combination as set forth in claim 14 wherein the registering teeth on said hub and on said synchronizer ring are formed with cam surfaces whereby a friction clutch engaging force is applied to said synchronizer ring when said sleeve and said hub are rotating at different speeds and said radially movable element is in a radially inward position with respect to the axis of said driven shaft, and spring means for normally urging said synchronizer ring into clutching engagement with said synchronizer clutch sleeve.

References Cited

UNITED STATES PATENTS

| | | | |
|---|---|---|---|
| 1,947,033 | 2/1934 | Bush | 74—372 |
| 3,283,613 | 11/1966 | Perkins | 74—331 |

FOREIGN PATENTS 650,577  2/1951  Great Britain.

DONLEY J. STOCKING, *Primary Examiner.*

H. S. LAYTON, *Assistant Examiner.*